United States Patent [19]

Stricker et al.

[11] 4,393,117
[45] Jul. 12, 1983

[54] HOT MELT TRANSFER COATING PROCESS AND PRODUCTS

[75] Inventors: George O. Stricker, Midlothian; Karl H. Teumer, Chicago; Ronald C. Groenendal, Oak Forest, all of Ill.

[73] Assignee: Ludlow Corporation, Chicago, Ill.

[21] Appl. No.: 282,581

[22] Filed: Jul. 13, 1981

[51] Int. Cl.³ .......................... C09J 7/04; B05D 3/12; B05D 5/10
[52] U.S. Cl. .................................. 428/352; 427/179; 427/208.8; 428/906
[58] Field of Search .................. 427/208.2, 208.8, 177, 427/179, 208.4; 428/352, 906

[56] References Cited
U.S. PATENT DOCUMENTS

| | | | |
|---|---|---|---|
| 2,532,011 | 11/1950 | Dahlquist et al. | 427/208.8 X |
| 2,678,284 | 5/1954 | Holt, Jr. | 427/208.2 X |
| 3,982,051 | 9/1976 | Taft et al. | 427/208.2 |
| 4,288,496 | 9/1981 | Reusser et al. | 428/352 X |

Primary Examiner—Evan K. Lawrence
Attorney, Agent, or Firm—Andrew F. Kehoe

[57] ABSTRACT

An improved process for coating a pressure sensitive adhesive upon a differential-release-type substrate and the products produced thereby. The coating procedure involves using a solvent-free hot-melt adhesive coating system and a short period of exposure to the environment of the web being processed between the time the web is coated with adhesive and spooled for packaging.

9 Claims, 1 Drawing Figure

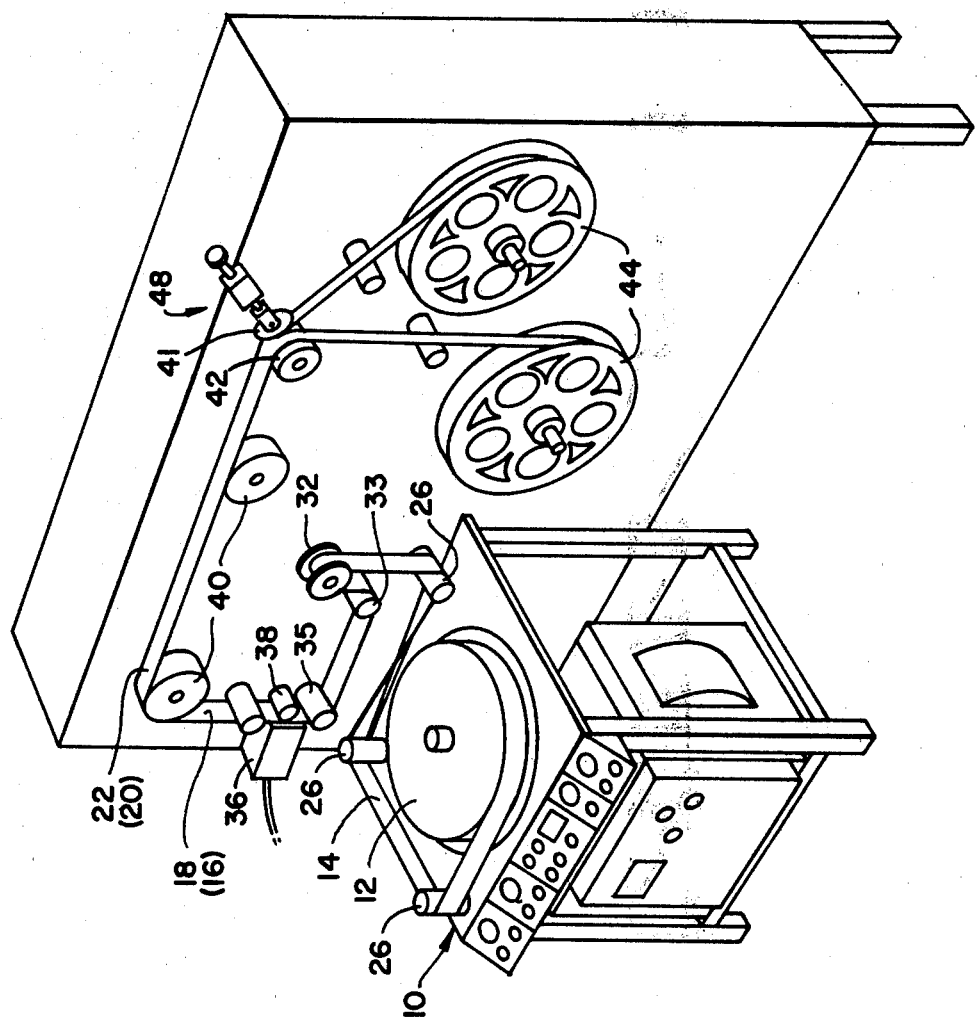

HOT MELT TRANSFER COATING PROCESS AND PRODUCTS

BACKGROUND OF THE INVENTION

This invention relates to the manufacture of readily-releasable adhesive material which is packaged and handled on a release coated web carrier, e.g. a paper carrier.

It is old to coat pressure sensitive adhesive on a substrate for eventual transfer to another substrate such as label stock or the like. A preferred procedure has been to place the coating on a substrate which is itself coated with a different release coating on each side of the substrate. The idea is to put the adhesive on a relatively difficult-to-release coat, yet a function release surface, but to have the back side of the substrate coated with a very easy-to-release coat so that when the adhesive-coated substrate is eventually unwound for use, there will be little release of the back-coating pulling the adhesive away from the surface on which it has been coated. Maintaining proper quality control of the two different release coatings has been a substantial problem, and it has been recognized as a problem by most manufacturers because failure inevitably results in defective rolls and, if such rolls are not intercepted, complaints from those who most use the rolls in subsequent processes to make products which incorporate the adhesive.

The work associated with the invention-to-be described below has allowed the inventor to have a further understanding of additional problems in the prior art which were not necessarily known to those encountering the problems. Such problems will be discussed below.

SUMMARY OF THE INVENTION

It is a principle object of the invention to provide an improved process for making a spooled-web product comprising (1) a substrate having two coatings of different release properties placed one on each of the sides of the substrate and (2) a pressure sensitive adhesive coated upon one of the release coatings.

Another object of the invention is to provide an improved spooled web carrying a releasable pressure sensitive adhesive.

Other objects of the invention will be obvious to those skilled in the art on their reading of the present invention.

The above objects have been substantially achieved by vastly reducing the time within which the differential-release coating is exposed to the environment between the time it is coated with adhesive and the time it is respooled in a package. This procedure then results in a chain of unforeseen but highly beneficial advantages. Thus, a substantially solvent-free, e.g. a hot-melt adhesive system is utilized to reduce the drying (solidification) time between the coating and respooling steps. This procedure avoids any "tubing" effect. "Tubing" is an effect whereby atmospheric moisture and/or temperature causes the paper web to curl inwardly. It has been a particularly severe problem with differentially-coated substrates on humid summer days. Many days the coating operations have simply been suspended because of the problem. Aforesaid reduction in drying time results in a decrease in the moisture associated tubing problem also.

Another significant advantage accrues from the practice of the invention: The conventionally-coated spooled products of the prior art frequently exhibited dimensional changes, called "gapping" after they had been ostensibly dried and packaged. This problem seems to have been substantially avoided by the new process. In retrospect, it is believed that the older material had some potentially volatile material associated with it even after drying. This material would evenutally volatilize and cause shrinkage of some of the components, principally the adhesive.

The process of the invention requires use of a so-called hot-melt adhesive, one that is substantially free from volatile solvent components.

Useful hot melt pressure sensitive adhesives are thermoplastic organic resin compositions sold under trade designations AMSCO Melt 347 by the Amsco Division of Union Oil Company and a material sold under the trade designation AG-5251 by Union Chemical Division.

The adhesives should be those that can be solidified rapidly. The viscosity of the applied coatings will usually be about 3,000–15,000 cps.

Processing speeds are conveniently within the range of 500 to 1000 fpm, and it is most desirable that the total time between coating and re-spooling be kept at from about 0.5 to 5 seconds, preferably less than about 2 seconds.

In a typical prior art process, the release coatings on either side of the substrate to be coated would be coated with silicone-type release coatings. The release coating on which the adhesive is to be deposited would have, typically, a 125 gram release valve. The release coating on the reverse side of the tape would have a 20 gram release valve. Selection of such parameters will theoretically assure that the finished adhesive coated web will unroll properly with the adhesive staying on the front face rather than being pulled off by adhesion to the back side of the web during the unwinding of the finished product. In fact, quality control of prior art adhesive and the different release coatings can be sufficiently difficult to monitor that a substantial amount of spoiled product is produced by the prior art method.

With implementation of the invention, it has been discovered that one effectively reduces the variability of the adhesive factor and greatly improves the quality control aspect of the invention. Indeed, the control is sufficient so that the release valve (a measure of the degree of force) may be safely reduced from ratios of 6:1, in a typical prior art coating operation, to a ratio of 4:1 or even less.

It is also emphasized that the process of the invention can be utilized, when convenient, in coating other paper substrates at high speed. In some cases, these substrates have one release coated side and, in other cases, the substrate being coated can be free of coating material. It appears that water condensation on the cooled side of the substrate adjacent to the chill or other cooling means roll is substantially avoided.

ILLUSTRATIVE EMBODIMENT OF THE INVENTION

In this application and accompanying drawings there is shown and described a preferred embodiment of the invention and suggested various alternative and modification thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWING

The FIGURE shows, schematically, one way of carrying out the process of the invention.

A coating apparatus comprises a table 10 on which a supply spool 12 of web 14 is placed in a horizontal position.

Web 14 is 2 inches in width and is coated with a first silicone coating 16 on one side 18 and a second silicone release coating 20 on the other side 22.

Coating 20 is formulated to have a considerably greater tack (i.e. resistance to release) with the adhesive than does coating 16.

Web 14 is unwound around rolls 26 and onto the coating-and-winding assembly 30 over steel nip roll 32 and driven rubber surfaced roller 33, thereupon past idler roll 35 to a heated, hot-melt coating head 36 which applies a thin coating of hot melt adhesive (Amsco Melt 347 Hot Melt Adhesive) to side 22 (with coating 20) of the web 14 as the web passes a driven back-up roll 38. The adhesive is applied at about 330° F. at 8 to 10 lbs. per ream of substrate and at about 800 feet per minute.

Thereupon web 14 proceeds around 8-inch diameter chill rolls 40 (about 45° F. surface) to a knife assembly 48 comprising a male knife 41 and female knife backup surface 42. Two distinct strips emerge from knife assembly 48. The two strips of material are wound on wind up rolls 44. The rolls are extremely stable, show no tendence to shrink to cause gapping on storage and are remarkably free of other defects attributable to drying problems encountered during procession.

The linear web exposed between the supply spool and the wind up spool is about 20 to 25 feet. The linear web exposed after coating before wind up is about from 10 to 15 feet.

It is also to be understood that the following claims are intended to cover all of the generic and specific features of the invention herein described and all statements of the scope of the invention which might be said to fall therebetween.

What is claimed is:

1. In a process for placing a releasable pressure-sensitive adhesive coating on an unspooled web which is being unwound from a supply spool and which comprises a first side having a first release coating having relatively high peel strength with respect to said adhesive coating, and a second side having a second release coating having relatively low peel strength affinity with respect to said adhesive coating, and thereupon spooling the resulting adhesive-coated web onto a packaging spool so that the surface of the adhesive coating contacts the second side of said substrate;

the improvement wherein said adhesive coating is applied as a substantially solvent-free hot-melt coating, said adhesive coating is caused to solidify by positive cooling applied to the unspooled web, wherein said cooling is controlled so that moisture condensation on the web is substantially avoided, and wherein the entire supply spool-to-packaging spool travel time of said web is a period of about 0.5 to 5 seconds.

2. A process as defined in claim 1 wherein said travel time is less than 2 seconds.

3. A process as defined in claims 1 or 2 wherein said release coatings are formed of two-distinct organic-resin-based polymers.

4. A process as defined in claims 1 or 2 wherein chill rolls are used to cool said web between coating with adhesive and spooling.

5. A process as defined in claims 1 or 2 wherein said release coatings are formed of two-distinct organic-resin-based polymers, at least one of which is a silicone-resin based polymer.

6. A spooled product bearing a releasable pressure sensitive adhesive thereon and formed by the process defined in claims 1 or 2.

7. A spooled product bearing a releasable pressure sensitive adhesive thereon and formed by the process defined in claim 3.

8. A spooled product bearing a releasable pressure sensitive adhesive thereon and formed by the process defined in claim 5.

9. A spool of a pressure-sensitive adhesive-bearing web made by the process of claims 1 or 3 and of the type wherein each side of the web comprises a different silicone release coating, and wherein said silicone release coatings have a maximum peel release ratio of about 4:1 with respect to their adhesion to said adhesive.

* * * * *